United States Patent
Ikuta

[11] Patent Number: 5,813,864
[45] Date of Patent: Sep. 29, 1998

[54] SIMULATOR

[75] Inventor: Junichi Ikuta, Tokyo, Japan

[73] Assignee: Namco Limited, Tokyo, Japan

[21] Appl. No.: 648,981

[22] Filed: May 17, 1996

[30] Foreign Application Priority Data

Nov. 30, 1995 [JP] Japan ................................ 7-336173

[51] Int. Cl.$^6$ .................................................. A63B 22/16
[52] U.S. Cl. ........................... 434/253; 434/247; 482/51; 482/71
[58] Field of Search ........................... 434/60, 247, 253; 482/1–9, 51, 71, 902; 273/400, 449

[56] References Cited

U.S. PATENT DOCUMENTS

| | | | |
|---|---|---|---|
| 4,906,192 | 3/1990 | Smithard et al. | 434/253 |
| 5,049,079 | 9/1991 | Furtado et al. | 434/253 |
| 5,191,258 | 3/1993 | Keller | 482/51 |
| 5,429,562 | 7/1995 | Milner | 482/71 |

Primary Examiner—Glenn Richman
Attorney, Agent, or Firm—Burns, Doane, Swecker & Mathis, LLP

[57] ABSTRACT

A simulator for presenting a simulation movement on a display correspondingly to a movement of an operator. The operator rides on a support plate and the support plate can be turned about a vertical axis line and can be tilted about a horizontal axis line. The support plate is equipped with a first reactive force applying device and a second reactive force applying device. The first reactive force applying device holds the support plate in a natural state in a neutral position with respect to the vertical axis line and applies reactive force to the support plate when the support plate turns from the neutral position. The second reactive force applying device holds the support plate in a natural state in a neutral position with respect to the horizontal axis line and applies reactive force to the support plate when the support plate tilts from the neutral positions. A simulation image displayed on a display screen is controlled corresponding to a turning of the support plate about the vertical axis line and a tilting about the horizontal axis line.

19 Claims, 8 Drawing Sheets

SIMULATOR

BACKGROUND OF THE INVENTION

1. Field of the Invention

The present invention relates to a simulator for presenting a simulation movement on presentation means such as a display correspondingly to a movement of an operator.

2. Related Art

Among other simulators, a skiing simulator which simulates a quasi-skiing movement of an operator or skier on boards used in lieu of a pair of skis has been known as disclosed in, for example, Japanese Patent Application Laid-open No. H3-222971. In such skiing simulator, a virtual skiing is performed by using the boards as an input device and is displayed on a display device.

As well known, skiing is performed with feet of the skier being fixed on respective skis. Recently, however, a down hill sliding with both feet of a player being fixed on a single board called "snow board" is becoming popular. The conventional skiing simulator mentioned above may be used to simulate the sliding using the snow board. However, in the conventional skiing simulator, a movement of the boards on which the skier rides are very simple and so it is difficult to give a realistic feeling of the board to the player.

In order to give such realistic feeling of the board to the skier or the operator, Japanese Patent Publication No. S58-15796 discloses a technique for turning a board in the form of a boat in a horizontal plane and rolling the board by tilting right and left sides of the board vertically about a center of the board. Further, Japanese Utility Model Publication No. H2-38777 discloses a technique in which a board on which an operator rides is swung about a caster provided on a lower surface of the board.

In these conventional techniques, however, the board merely turns or tilts according to a movement of the operator on the board and there is no measure taken for transmitting a reaction of the board to the operator when the board moves. Therefore, when a sliding along a surface of snow ground is to be simulated, it is impossible to simulate a reaction of the snow surface to the skier and thus it is impossible to simulate the skiing with realism.

Further, there is no technical thought of reflecting the movement of board on presentation means such as a display in these conventional arts and, therefore, there is no suggestion about how to transmit the board movement to the display.

On the other hand, Japanese Patent Publication Laid-open Nos. S60-119969 and H4-150877 disclose techniques for turning and tilting a surfboard on which a surfer rides by means of a drive device including hydraulic cylinders and motors. In such techniques, however, the board is moved by not an action of an operator but a movement of the drive device and, therefore, there is no thought of moving the board correspondingly to a movement of the operator.

Further, the last two techniques do not include the technical thought of reflecting the movement of board on a display and, therefore, there is no suggestion about how to transmit the board movement to the display.

SUMMARY OF THE INVENTION

The present invention was made in view of the problems mentioned above and has an object to provide a simulator capable of simulating a movement of a person on a supporting plate such as a board with realism.

In order to achieve the above object, a simulator according to the present invention, which can display a simulating movement on presentation means correspondingly to a movement of an operator, is characterized by comprising (1) a support plate for supporting the operator, the support plate being able to turn about a first axis line and to tilt about a second axis line extending in a direction crossing the first axis line, (2) first reactive force applying means for holding the support plate in a free state in a neutral position with respect to the first axis line and for applying a reactive force to the support plate when the support plate is turned from the neutral position, (3) second reactive force applying means for holding the support plate in a free state in a neutral position with respect to the second axis line and for applying a reactive force to the support plate when the support plate is tilted from the neutral position and (4) control means for controlling a simulating operation on the presentation means correspondingly to a reciprocal movement of the support plate about the first and second axis lines.

According to this simulator, it is possible to positively reflect a turning and tilting movements of the support plate by the operator to a simulating movement on the presentation means. Since the simulating movement is controlled by a composite movement which is a combination of the turning and tilting movements, it is possible to realize a precise simulation. Further, it is possible to experience a reactive force from ground surface, etc., by means of the action of the first and second reactive force applying means, and thus, it is possible to provide a simulation movement with realism.

The first axis line means an axis line about which the support plate can be turned and is usually a straight line extending vertically of a floor surface on which the simulator is arranged. Further, the second axis line may cross the first axis line at right angle or any other angle with respect to the first axis line. When the second axis line crosses the first axis line orthogonally thereto, it is possible to precisely simulate a snow board sliding or a skiing.

A configuration of the support plate may be arbitrarily selected suitably for a simulation movement to be aimed. For example, when the snow board sliding is to be simulated, the support plate may take a form similar to the snow board.

The presentation means is means for making an operator visually recognizable an arbitrary simulation movement and a presentation method therefor may be any so long as the above matter is realizable. For example, it is possible to use a display for presenting the simulation movement as a video image or a doll model, etc., for presenting it realistically. By displaying a virtual game space as an image by using such display, it is possible to display a larger number of various simulation movements than those displayable by the presentation means constructed with actually movable things.

The first and second reactive force applying means may employ any of constructions which are capable of realizing movements defined in the appended claims. For example, the first or second reactive force applying means may be constructed with a core member movable integrally with the support plate and having a polygonal cross-sectional configuration, a casing member having a polygonal cross-sectional configuration and surrounding the core member and an elastic member disposed between the core member and the casing member. The elastic member functions to generate a repulsive force by compression and may be of rubber or synthetic resin material, etc. The term "polygonal cross section" means a triangle cross section, a square cross section or any other polygonal cross section. By constructing the first and second reactive force applying means as mentioned, the simulator can be made very compact in appearance, simple in structure and stable in operation without malfunction.

The control means can be constructed with an electric control system including a computer. The control means has to be able to detect a turning angle of the support plate about the first axis line and a tilting angle thereof about the second axis line. Therefore, the support plate is provided with first rotation angle detecting means for detecting the turning angle about the first axis line and second rotation angle detecting means for detecting a tilting angle of the support plate about the second axis line. These detecting means may be constructed with angle detectors each having a variable resistor whose resistance value changes with a rotation angle of an input shaft, respectively.

Assuming a sliding using the snow board as a movement to be simulated, a body of an operator who rides on the snow board with his feet being on a center line of the board, that is, his body being lateral to the presentation means and only his head being directed to the presentation means. In view of such posture of the operator, it is preferable to provide a handrail member in a space around the support plate. For example, such handrail member may be constructed by arranging rod members, one extending between the operator on the support plate with his body being lateral with respect to the plate and the presentation means and two being on respective sides of the support plate. When the operator moves his body using the handrail members as fulcrum, it is possible to make a moving amount of the support plate larger.

Further, when the sliding with the snow board is considered, the body of the operator has to be lateral with respect to the presentation means. Therefore, it is preferable to provide protruding guides on the support plate for guiding feet of the operator such that, when the operator rides on the support plate, his body is automatically made lateral with respect to the presentation means. For example, the protruding guides may be constructed with a plurality of parallel spaced protrusions extending in directions to the presentation means by a distance corresponding to a length of the player's foot.

DETAILED DESCRIPTION OF THE PREFERRED EMBODIMENTS

Figure 6:
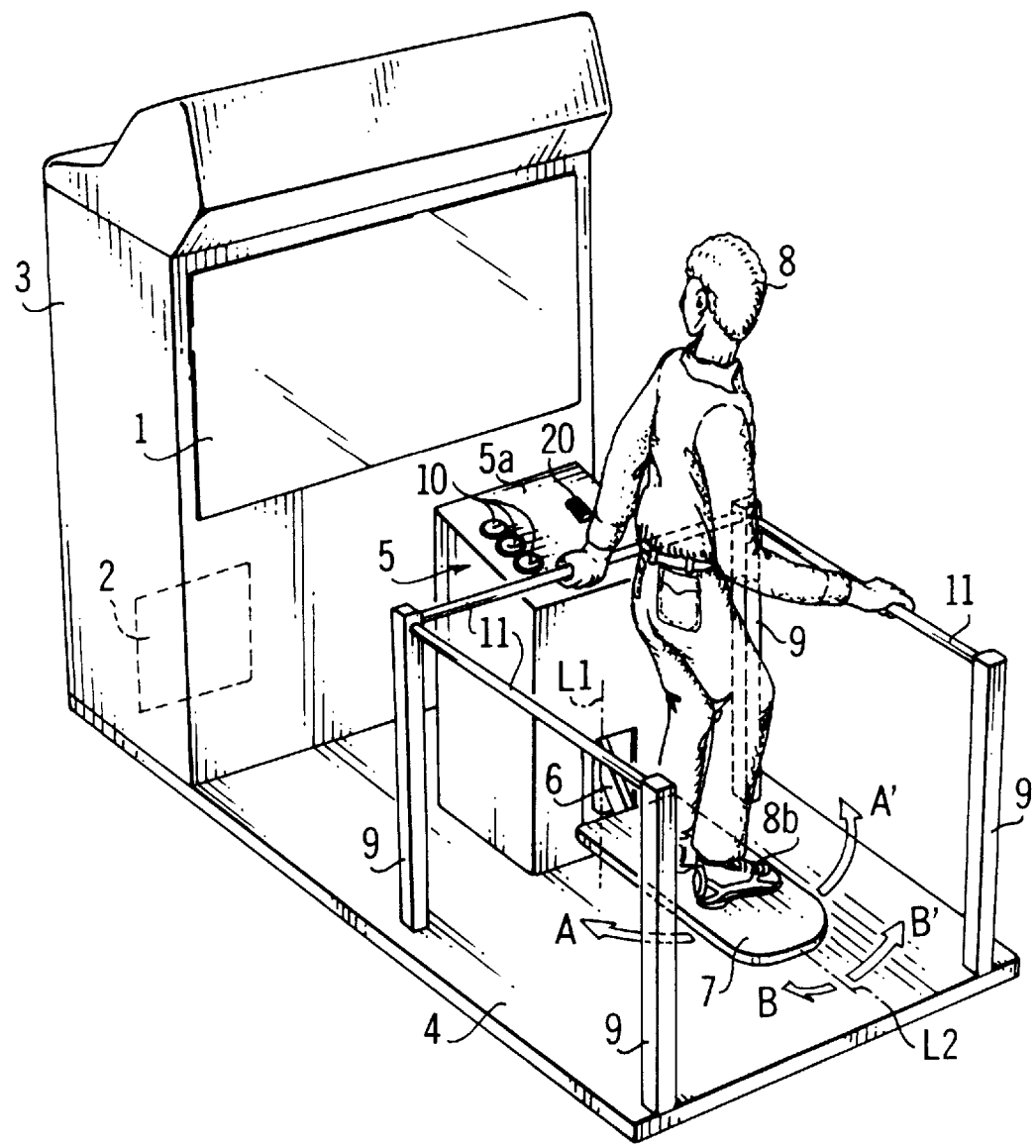
FIG. 6 is a perspective view showing an appearance of an embodiment of the simulator according to the present invention.

FIG. 6 shows a whole appearance of an embodiment of a simulator according to the present invention. This simulator includes a casing 3 which supports a display 1 as presentation means and houses a control device 2 for controlling the display 1. An operating portion 5 is provided on a base plate 4 extending from the casing 3 and an end portion of a support plate 7 is supported by an arm member 6 extending from a lower portion of the operating portion 5, in the form of a cantilever. An operating panel 5a equipped with various selector buttons 10 and a coin inlet port 20, etc., is provided on an upper plane of the operating portion 5. An operator 8 can ride on the support plate 7 and control a picture as a simulating movement displayed on the display screen 1 by turning the support plate 7 about a first axis line L1 in a horizontal plane such as shown by an arrow A–A' and/or tilting it about a second axis line L2 as shown in an arrow B–B'. In this embodiment, the first axis line L1 is a vertical line and the second axis line L2 is a horizontal line.

In this embodiment, a scene of a skiing ground and a picture of a running skier on a snow board are displayed on the display 1. Further, the support plate 7 is shaped like a snow board. Four vertical support poles 9 are implanted in the base plate 4 around the support plate 7 and a handrail member 11 is provided between the poles 9 on the side of the display 1 so that one hand, in the shown case, a left hand, of the operator 8 can grasp it and two handrail members 11 are provided between the poles 9 on respective sides of the support plate 7 so that the other hand, in the shown case, the right hand, of the operator 8 can grasp one of them. The handrail members 11 take in the form of rod members of relatively rigid material. The operator 8 can roughly operates the support plate 7 by holding on to these handrails.

Figure 1:
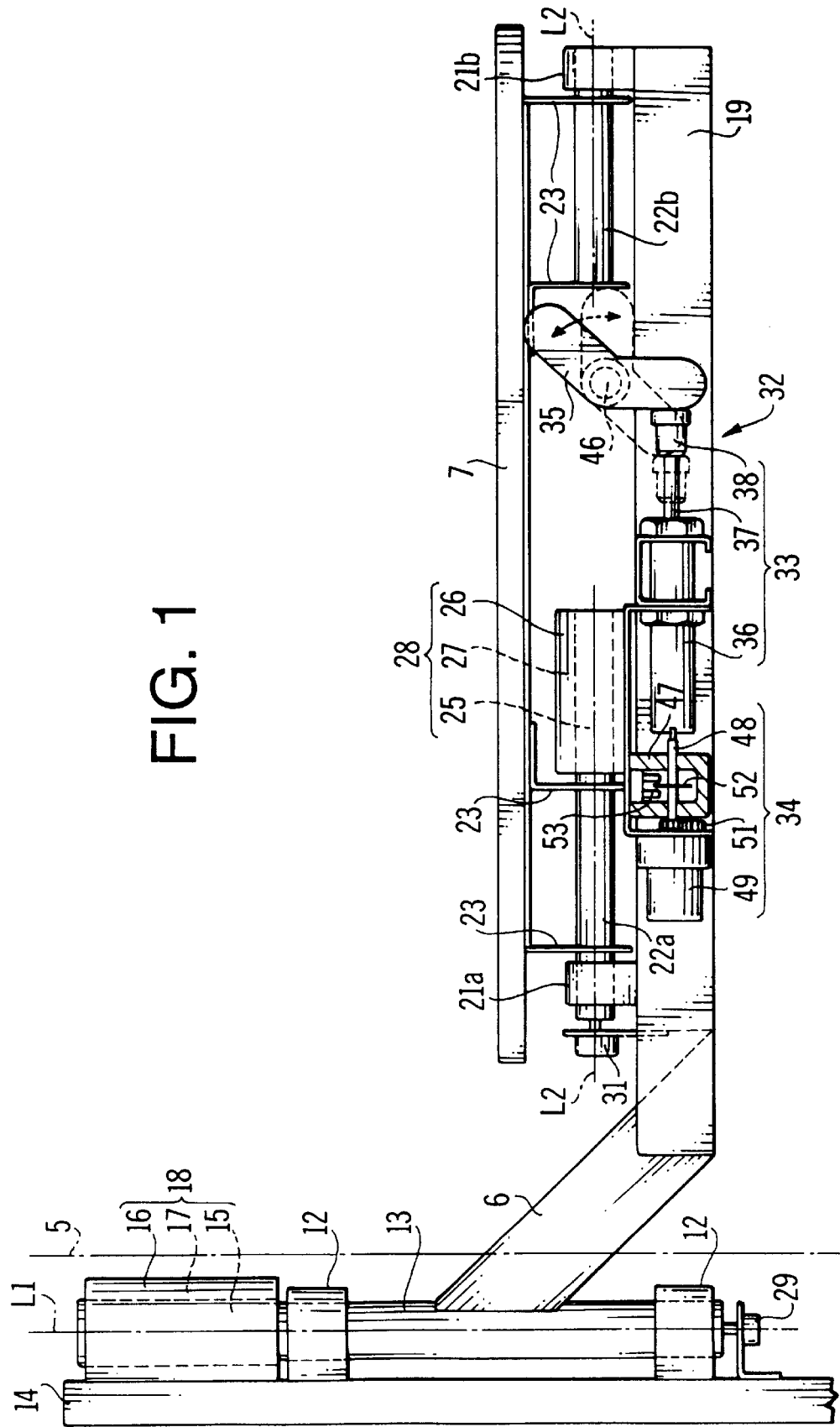
FIG. 1 is a side view showing a main portion of a simulator according to the present invention.
Figure 2:
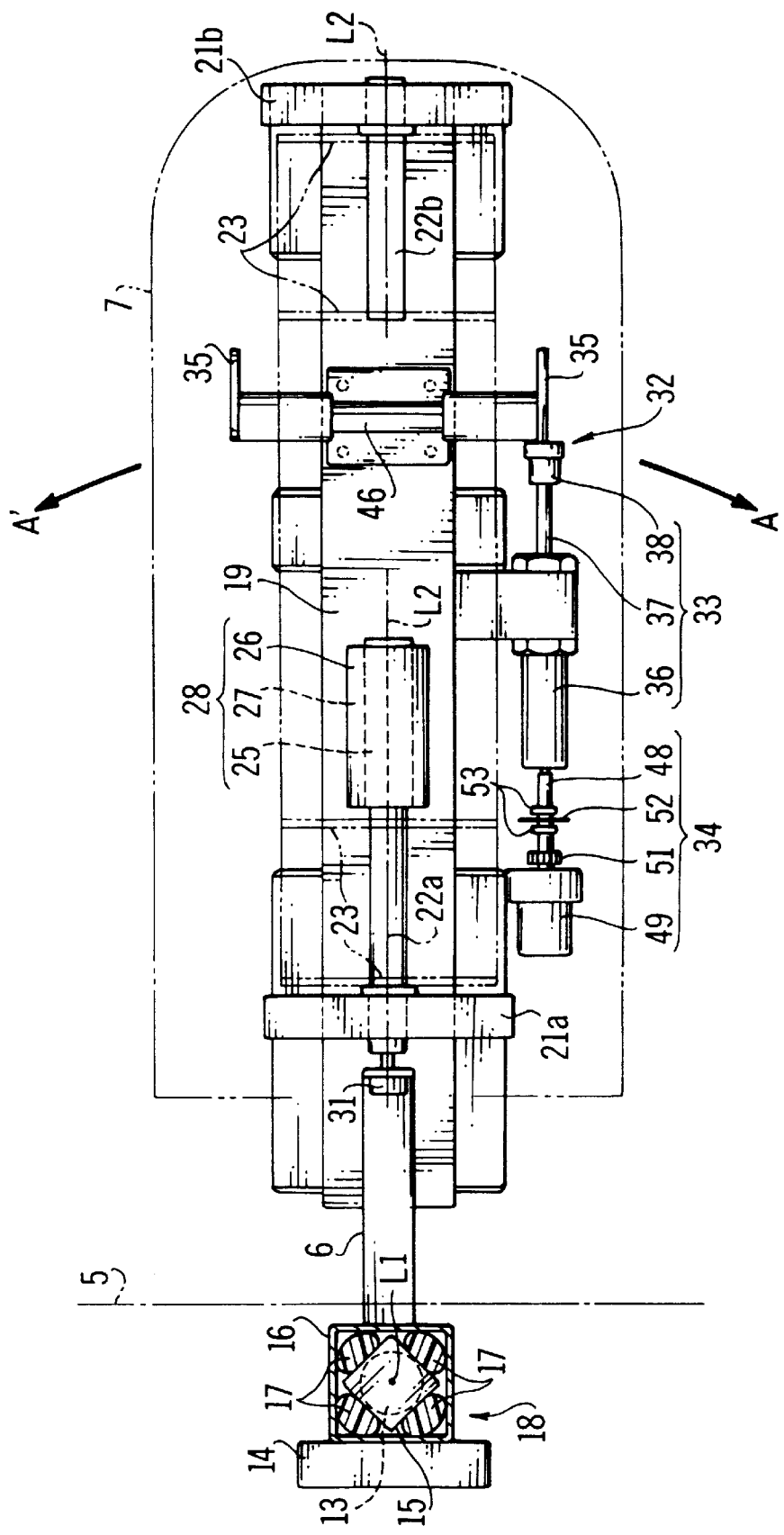
FIG. 2 is a plan view of the main portion shown in FIG. 1.
Figure 3:
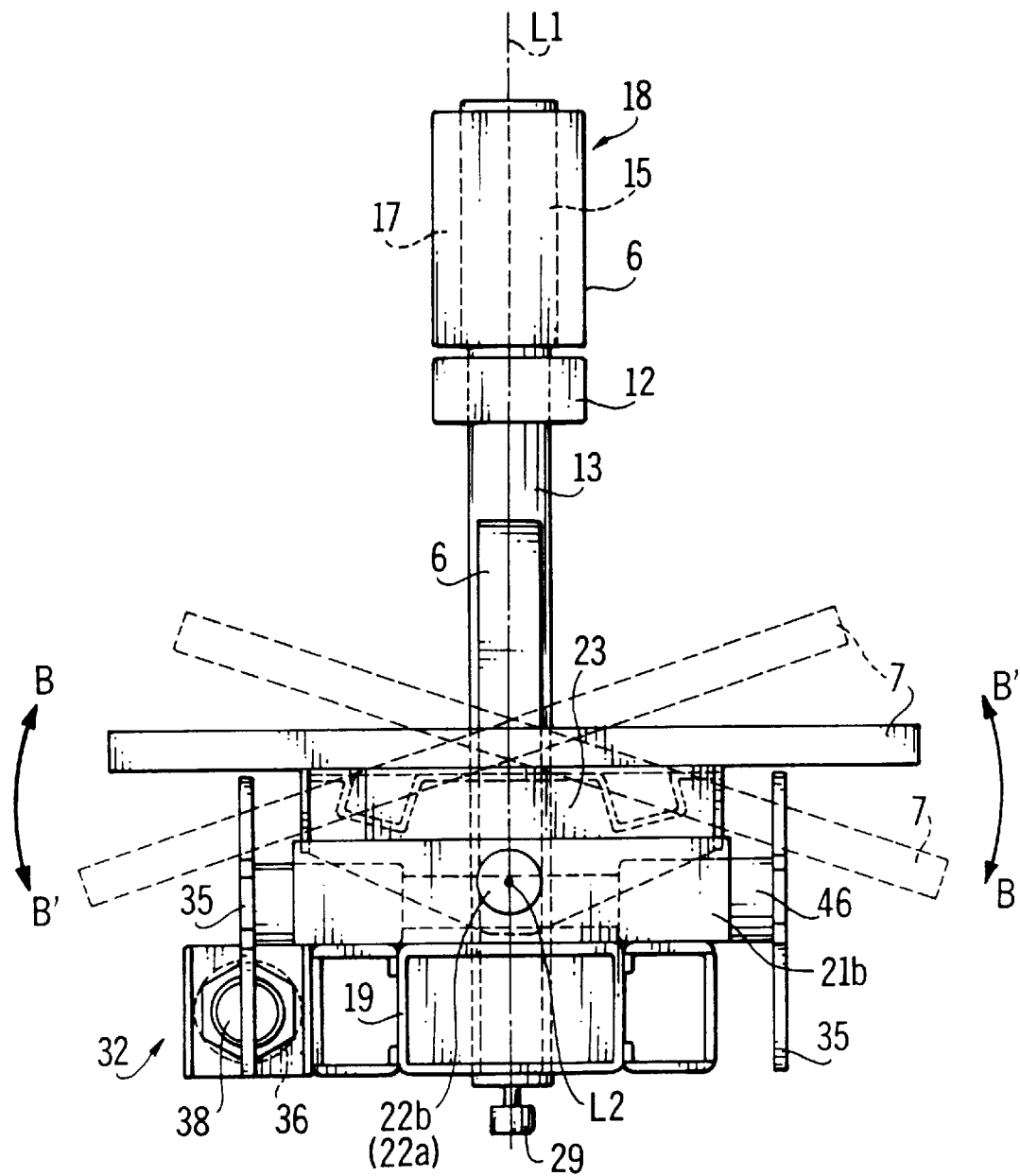
FIG. 3 is a front view of the main portion shown in FIG. 1.

The support plate 7 may have a structure such as shown in FIG. 1 to 3 which are a side view, a plan view and a front view of the support plate 7, respectively. In FIG. 1, a rotary shaft 13 supported rotatably about the first axis line L1 by bearings 12 fixed on a frame 14 but immovably in vertical direction is provided within the operating portion 5. The arm member 6 is fixed to the rotary shaft 13. A first reactive force applying device 18 is provided on an upper end of the rotary shaft 13, which is constructed with a core member 15 which is integral with the rotary shaft 13 and has a square cross section, a casing member 16 which surrounds the core member 15 and has a square cross section and a rubber member 17 as an elastic member inserted into a space defined between the casing member 16 and the core member 15, as shown in FIG. 2. The casing member 16 is fixed to the frame 14. The elastic member 17 may be formed of other material than rubber, such as synthetic resin which produces a reactive force when compressed.

In FIG. 1, a horizontal cylinder base 19 having a square cross section is rigidly fixed to a lower end portion of the arm member 6. On the cylinder base 19, are fixed bearing members 21a and 21b which support respective rotary shafts 22a and 22b rotatably about the second axis line L2. Brackets 23 fixed to a bottom surface of the support plate 7 are fixed on outer peripheral surfaces of the rotary shafts 22a and 22b. With the above mentioned construction, the support plate 7 can be turned in a horizontal plane (in directions shown by a double arrow A–A') about the first axis line L1 and tilted in directions shown by a double arrow B–B' in FIG. 3 about the second axis line L2.

Figure 5:
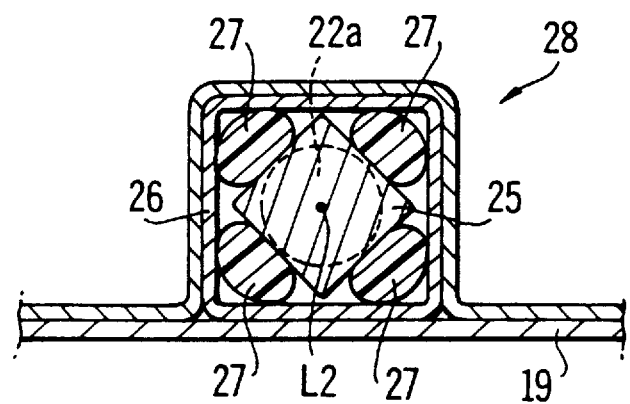
FIG. 5 is a cross sectioned front view showing a main portion of, particularly, a reactive force applying mechanism used in the structure shown in FIG. 1.

In FIG. 1, a second reactive force applying device 28 is provided in a right side end of the rotary shaft 22a nearby the operating portion 5. As shown in FIG. 5, the second reactive force applying device 28 is constructed with a core member 25 which is integral with the rotary shaft 22a and has a square cross section, a casing member 26 which surrounds the core member 25 and has a square cross section and a rubber member 27 as an elastic member inserted into a space defined between the casing member 26 and the core member 25, like the first reactive force applying device 18. The casing member 26 is fixedly secured to an upper surface of the cylinder base 19.

In FIG. 2, the elastic members 17 of the first reactive force applying device 18 are in an equilibrium state dynamically when there is no external force is applied to the support plate 7 and the support plate is held in a neutral position. When the support plate 7 is turned in the direction of the arrow A or the arrow A', the rotary shaft 13 supporting the support plate 7 rotates together therewith and so the core member 15 rotates therewith. When the core member 15 rotates, the respective rubber members 17 are urged to the casing member 16 and elastically deformed resulting in a reactive force. The reactive force varies proportionally to the rotation angle of the rotary shaft 13, that is, the turning angle of the support plate 7.

The rubber member 27 of the second reactive force applying device 28 are dynamically in an equilibrium state when there is no external force applied to the support plate 7 as shown in FIG. 5 and the support plate 7 is held in a horizontally neutral position shown by a solid line shown in FIG. 3. When the support plate 7 is tilted in the direction of the arrow B or B', the rotary shaft 22a supporting the support plate 7 rotates and the core member 25 rotates integrally therewith. When the core member 25 rotates, the respective rubber members 27 are urged against the casing member 26, resulting in a reactive force due to the elastic deformation thereof. This reactive force is changed proportionally to the rotation angle of the rotary shaft 22a, that is, the tilting angle of the support plate 7.

In FIG. 1, a first angle sensor 29 including a variable resistor having a resistance value which varies correspondingly to a rotation angle of the rotary shaft 13 is provided on a lower end portion of the rotary shaft 13 which rotates about the first axis line L1. Further, a second angle sensor 31 including a variable resistor having a resistance value which varies correspondingly to a rotation angle of the rotary shaft 22a is provided on an end portion of the rotary shaft 22a which rotates about the second axis line L2.

A lock device 32 for preventing the support plate 7 from tilting about the second axis line L2 is provided on a lower portion of the support plate 7. The lock device 32 includes a reactive force generator 33, a reactive force regulator 34 and a lever 35. The reactive force generator 33 includes a main portion 36, an output rod 37 which can enter into the main portion 36 and a pressing piece 38 fixed on an end portion of the output rod 37.

Figure 4:
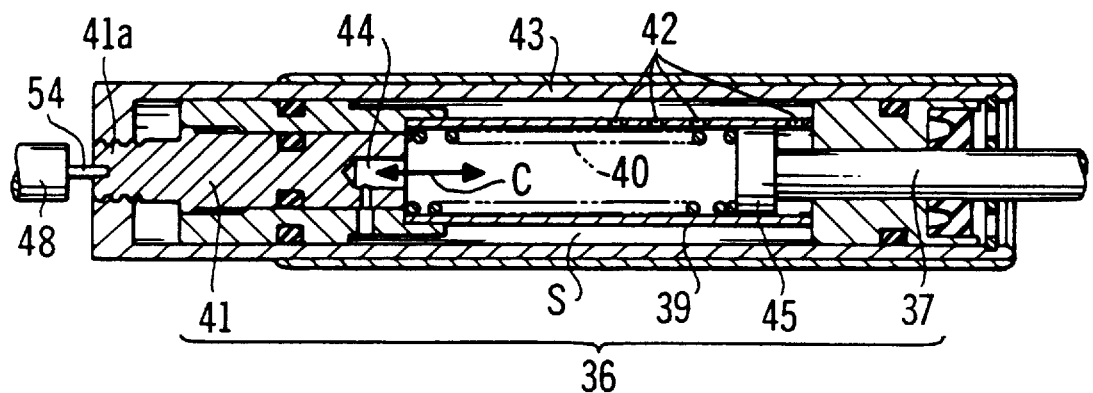
FIG. 4 is a cross sectional side view showing a main portion of, particularly, a lock mechanism used in the structure shown in FIG. 1.

As shown in FIG. 4, the main portion 36 of the reactive force generator 33 includes an outer cylinder 43, an inner cylinder 39 and a movable element 41. A plurality of orifices 42 are provided in the inner cylinder 39 and a piston 45 integral with the output rod 37 slides along an inner peripheral surface of the inner cylinder 39. A left end portion 41a of the movable element 41 is screwed into a rear end portion of the outer cylinder 43 such that the movable element 41 slides forward and backward in directions shown by a double arrow C by turning the left end portion 41a. An annular space S is defined between the inner cylinder 39 and the outer cylinder 43 and communicates with an interior of the inner cylinder 39 through the orifices 42. The movable element 41 is formed with a fluid passage 44 communicating with the space S. A cross sectional area of the passage 44 is changed by the movement of the movable element 41 in the directions C to thereby regulate a flow rate of fluid such as oil flowing through the passage 44.

The inner cylinder 39 and the space S are filled with fluid such as oil and a reactive force is transmitted to the output rod 37 through an action of the fluid. The reactive force becomes maximum when the passage 44 of the movable element 41 is completely closed to make the flow rate of the fluid minimum and becomes minimum when the passage 44 is fully opened to set the flow rate a maximum value. When the reactive force becomes maximum, the leftward movement of the output rod 37 is completely blocked, resulting in the so-called lock state. On the other hand, when the reactive force becomes minimum, the output rod 37 is allowed to move leftward freely.

In this embodiment, when the end portion 41a of the movable element 41 is set to a reference position corresponding to an angle 0°, the passage 44 is fully opened and the output rod 37 is unlocked. On the other hand, when the end portion 41a is turned by an angle 180° from the reference position, the passage 44 is fully closed and the output rod 37 becomes in the locked state. In an angle between 020 and 180°, a magnitude of the reactive force, that is, a lock force, against the output rode 37 is changed proportionally to the angle of the end portion 41a of the movable element 41. The output rod 37 is biased outward from the outer cylinder 43 by a compression spring 40 such that it protrudes fully from the outer cylinder 43 normally.

In FIG. 1, the pressing piece 38 mounted on the end portion of the output rode 37 is in contact with a lower end of the lever 35. As shown in FIG. 2, the lever 35 is fixed to each of opposite ends of a rotary shaft 46 provided rotatably on the cylinder base 19. That is, the levers 35 are provided in positions corresponding to both sides of a lower surface of the support plate 7, respectively, such that, when the support plate 7 is horizontal, the output rod 37 fully protrudes from the cylinder main portion 36 and pushes free ends of the levers 35 up to the highest positions as shown by solid lines so that they contact with the lower surface of the support plate 7. On the other hand, when the support plate 7 tilts about the second axis line L2, the levers 35 are pushed down as shown by dotted lines and the output rod 37 is retracted to the interior of the main portion 36.

When the output rod 37 is fully protruded to put the ends of the levers 35 in the highest positions and the inner fluid passage 44 of the reactive force generator 33 is fully closed, the levers 35 are locked in the highest positions. In this state, the support plate 7 is locked in the horizontal state and, therefore, the support plate 7 is not tilted even if the operator rides thereon.

In FIG. 1, the reactive force regulator 34 provided rearward of the reactive force generator 33 includes a rotary shaft 48 rotatably supported by a bracket 47 fixed to a side portion of the cylinder base 19, a motor 49 and a gear train 51 for transmitting rotation of the motor 49 to the rotary shaft 48. In FIG. 4, a screwdriver 54 is provided on an end portion of the rotary shaft 48 and is fitted in the left end portion 41a of the movable element 41. Further, in FIG. 1, a wheel 52 is fixedly provided in a suitable position on the rotary shaft 48. The wheel 52 has marks for detecting a rotation angle of the rotary shaft 48. An optical sensor 53 of a transmitting or reflective type is also provided for detecting the marks of the wheel 52. In this embodiment, the marks are indicated correspondingly to the cases where the rotation angle of the end portion 41a of the movable element 41 shown in FIG. 4 is the reference angle 0° (fully opened) and is 180° (fully closed), respectively.

When the motor 49 rotates and the rotary shaft 48 rotates from the fully closed position (180°) to the fully open position (0°), the levers 35 and hence the support plate 7 changes the state from the locked state to the unlocked state. The reactive force generated by the reactive force generator 33 and transmitted to the output rod 37 is changed gradually and continuously from the maximum realizing the locked state to the minimum at which there is substantially no reactive force generated, during this state change of the support plate 7. Therefore, when the operator rides on the support plate 7 which is locked in a horizontal state and then unlocks the support plate 7 to start a simulation, the support plate 7 is unlocked not abruptly but gradually.

In FIG. 6, the control device 2 provided within the casing 3 is constructed with an electric circuit including a computer and includes, for example, a game operation portion 61 and a picture synthesizing portion 62. An operating portion 63 includes the various selection buttons 10, a coin sensor for detecting coins inputted through the coin inlet port 20, the first angle sensor 29 for detecting a turning angle of the support plate 7 and the second angle sensor 31 for detecting a tilting angle of the support plate 7, etc.

The game operation portion 61 includes a map information memory 64, a moving object information memory 65, a game space operating portion 66 and a memory portion 67. The map information memory 64 stores an information related to board running courses as a divided map information. That is, the course information is stored therein as plane coordinates and altitude coordinates of respective ground points. The moving object information memory 65 stores a current position of a board player as three-dimensional coordinates. The game space operating portion 66 reads the current position of the board player from the moving object information memory 65, arithmetically operates a movement of the board player on the basis of an operating signal from the operating portion 63 and a topography signal from the map information memory 64 and arithmetically operates a position to which the board player moves according to changes of natural conditions and change of wind which are stored in the memory portion 67. The memory content of the moving object information memory 65 is updated every ⅟₆₀ second on the basis of the operation of the game space operating portion 66 because the display 1 is used as means for displaying the simulating movement. The game space operating portion 66 arithmetically operates the positional coordinates of not only the board player corresponding to the operator on the support plate 7 but also other board players displayed on the display 1.

Figure 8:
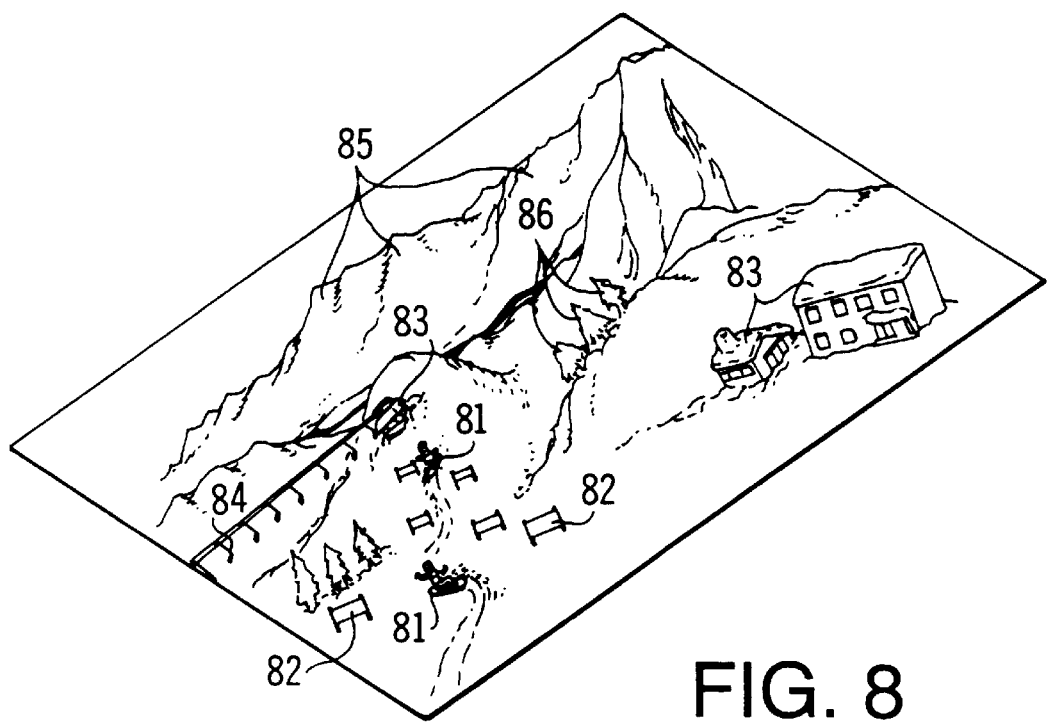
FIG. 8 shows, three-dimensionally, an example of a simulation operation represented by the simulator shown in FIG. 6.

The picture synthesizing portion 62 includes a three-dimensional operating portion 68, a picture drawing portion 69 and an object picture information memory 71. The object picture information memory 71 stores an information necessary for producing a picture of a course, such as a picture information of moving objects such as board players and a picture information of such as snow ground, mountains, woods, streams and houses. The three-dimensional operating portion 68 reads a picture information corresponding to data output from the game space operating portion 66, that is, the moving object information and the divided map information, etc., and arithmetically operates a three-dimensional game space such as shown in FIG. 8. In FIG. 8, 81 depicts board players, 82 flags, 83 houses, 84 a lift, 85 snowy mountains and 86 trees.

Figure 9:
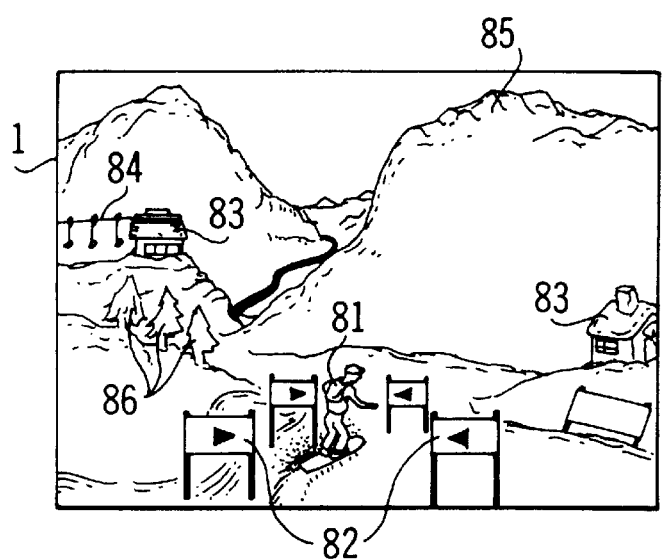
FIG. 9 shows the three-dimensional space shown in FIG. 8 when displayed two-dimensionally on a display.

The three-dimensional operating portion 68 further operates the game space by performing a clipping processing for excluding data outside a field of sight, perspective projection conversion into a screen coordinate system and sorting processing and outputs the data after processed to the picture drawing portion 69. The picture drawing portion 69 converts the output data from the three-dimensional operating portion 68 into a video data which can be displayed on the display 1. For example, the three-dimensional game space shown in FIG. 8 is displayed on the display 1 as a picture shown in FIG. 9. This video image is updated every ⅟₆₀ second by the operation in the game space operating portion 66 such that the operator recognizes it as a scene of the continuously changing skiing ground.

An operation of the simulator constructed as mentioned above will be described. In FIG. 1, the support plate 7 is held in the neutral position within a range in which the support plate 7 can be turned by the first reactive force applying device 18 and in the neutral position within the tilting range by the second reactive force applying device 28, that is, in a horizontal state. Further, the support plate 7 is locked in the horizontal state by the lock device 32.

Thereafter, the operator 8 gets on the support plate 7 as shown in FIG. 6. Since, at that time, the support plate 7 is in the locked state, it is not moved or tilted in any way even if an external force in any direction is applied thereto. Then, when the operator puts a coin in the coin inlet port 20 and operates the selection buttons 10, the simulator enters into a simulating operation, that is, in this embodiment, the snow board game is started. When the game is started in the embodiment shown in FIG. 1, the motor 49 of the reactive force regulator 34 is actuated to rotate the rotary shaft 48 from the fully closed 180° position to the fully open 0° position. Thus, the fluid passage 44 (see Fig.4) of the main portion 36 of the reactive force generator 33 is gradually opened to the fully open position and the locking force applied to the support plate 7 is gradually reduced from the maximum value to the minimum value.

When the locking force is completely removed, the support plate 7 is enabled by an action of the operator 8 to reciprocally tilt about the second axis line L2 freely. Since the locking force is removed not abruptly but gradually with increase of rotation angle of the rotary shaft 48 of the motor 49, the support plate 7 becomes the state where it can freely tilt not abruptly but gradually. In this embodiment, there is no locking device provided for a reciprocal turning of the support plate 7 about the first axis line L1. Therefore, the support plate 7 is not locked in such turning directions. When the support plate 7 is also to be locked in such directions, a locking device similar to the locking device 32 may be provided on the rotary shaft 13.

Figure 7:
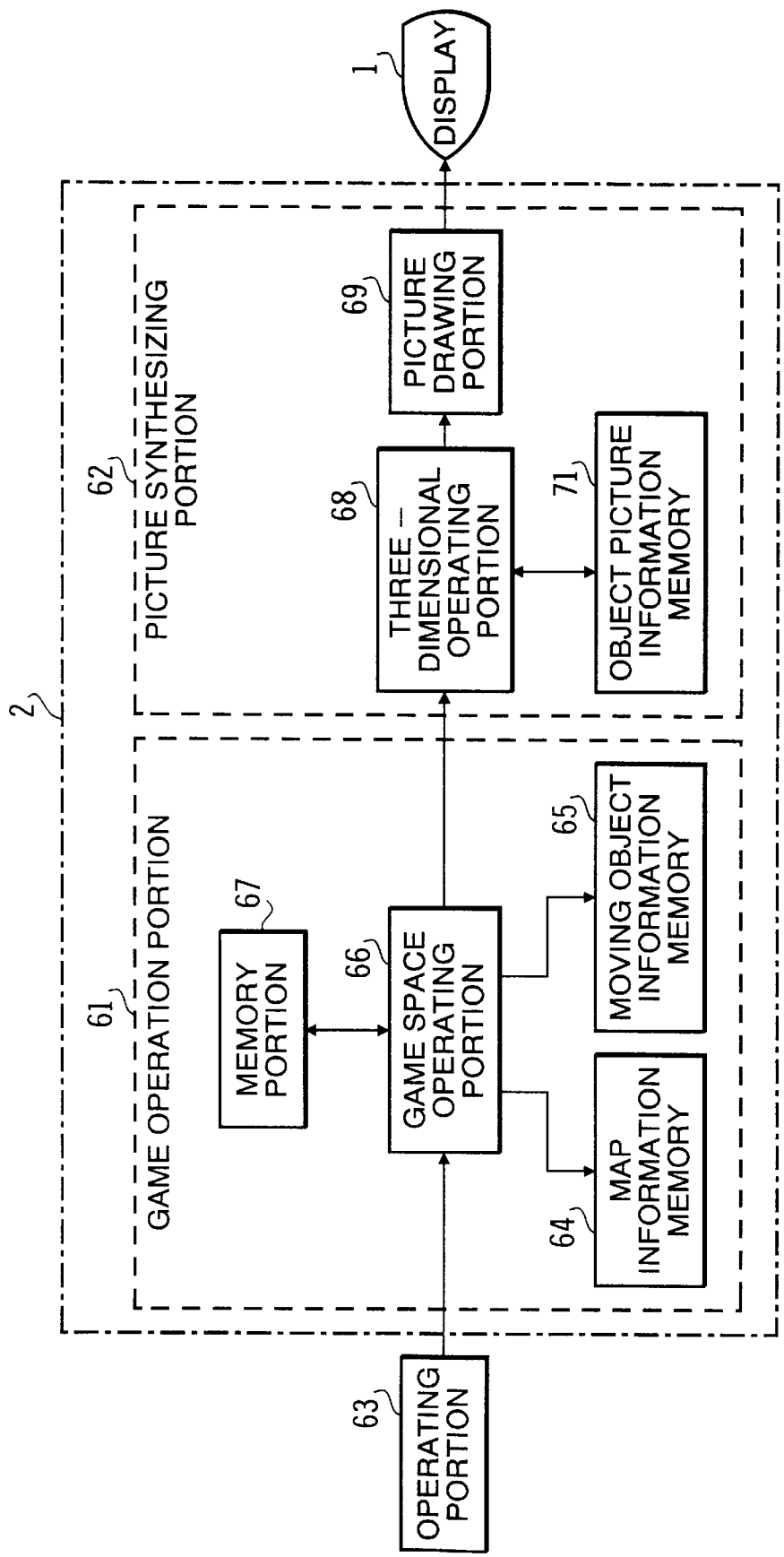
FIG. 7 is a block diagram showing an example of an electric control system used in the simulator shown in FIG. 6.

After the support plate 7 is unlocked, a video picture simulating a change of scenery experienced by a skier when he runs along a ski ground is displayed on the display 1 and the operator 8 maneuvers the support plate 7 by his legs while looking at the scenery such that he runs down on a snow board. In concrete, the operator 8 turns the support plate 7 about the first axis line L1 and/or tilts it about the second axis line L2. In this case, the turning angle and the tilting angle of the support plate 7 are detected by the first angle sensor 29 and the second angle sensor 31 and supplied to the game space operating portion 66 (FIG. 7). The game space operating portion 66 controls the scenery and the board player displayed on the display 1 on the basis of the angle information. In this manner, the operator 8 can positively participate in the running screen displayed on the display 1, that is, the simulating operation, by turning and/or tilting the support plate 7.

In FIG. 2, when the support plate 7 turns about the first axis line L1 and is deviated in angle from the neutral position, the rubber member 17 in the first reactive force applying device 18 is compressed by the core member 15 and generates a reactive force which is felt by the operator 8 through the support plate 7. In FIG. 5, when the support plate 7 is tilted about the second axis line L2 and is deviated in angle from the neutral position, that is, the horizontal state, the rubber member 27 in the second reactive force applying device 28 is compressed by the core member 25 and generates a reactive force which is felt by the operator 8 on the support plate 7. With such reactive forces, the operator 8 can get bodily sensation of actual reactive forces produced when an actual board player on a snow board turns on a snow ground and when the board player stems with using a snow board edge.

In this embodiment, an image of a sliding snow board is displayed on the display 1 as a simulation movement and the support plate 7 is configured similarly to an actual snow board. Therefore, the operator 8 operates the support plate 7 while standing thereon with his feet being positioned on a center axis of the support plate 7. By operating the support plate with utilizing the handrail 11 as a fulcrum, the operator 8 can turn and tilt the support plate 7 in large angle ranges.

Figure 10:
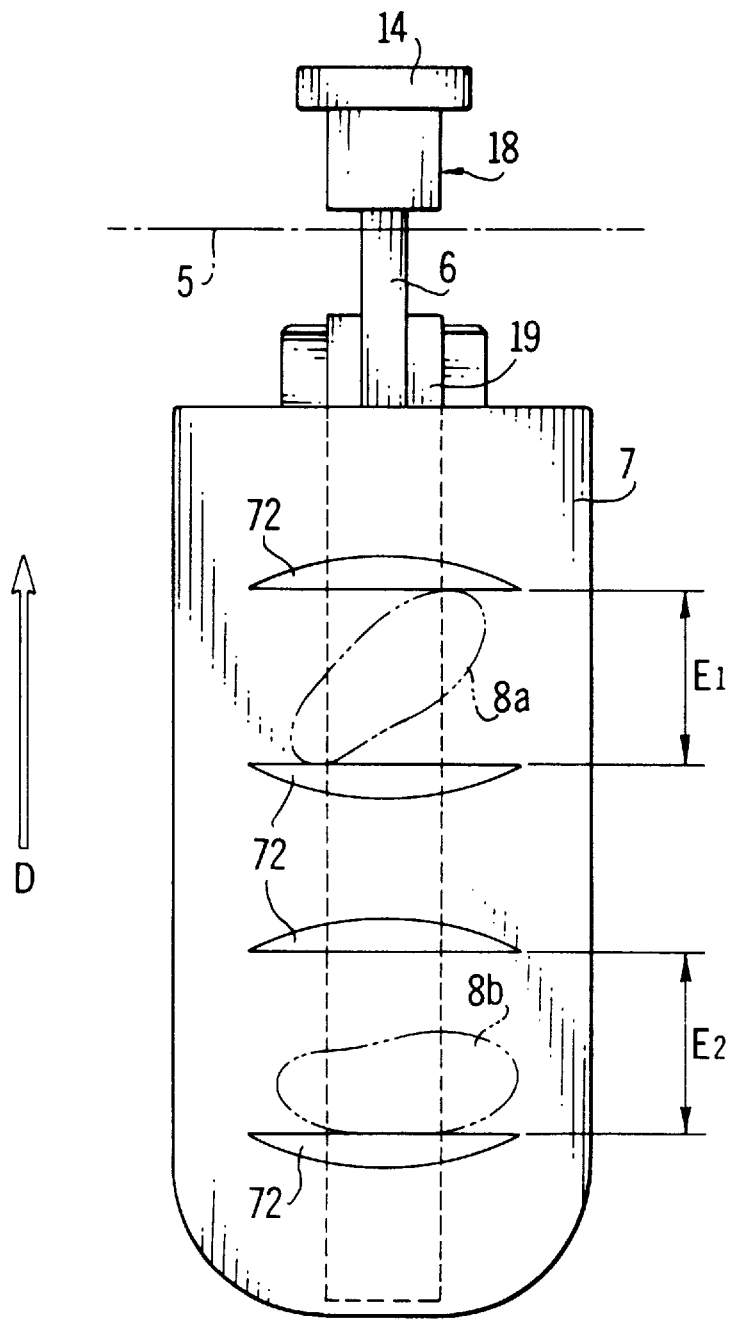
FIG. 10 is a plan view of a modification of the support plate.

When a snow board is to be simulated, the operator 8 has to operate the support plate 7 while standing thereon with his feet being positioned on the center axis of the support plate 7. If he stands on the support plate 7 with his feet being in parallel to the center line of the support plate 7, a normal snow board maneuvering is impossible. In order to make the feet of the operator 8 possible to be put in predetermined positions without special attention, it is preferable to provide guides for guiding the feet 8a and 8b of the operator 8 to the predetermined positions on the support plate 7 which positions are separated from each other by a suitable distance in a direction shown by an arrow D which is parallel to the center line of the support plate 2 and directed to the display 1. In this embodiment, the guide is composed of a pair of protrusions 72 which are arranged in parallel to each other with a distance E1 (E2) corresponding to a length of the foot 8a (8b) of the operator 8 on the support plate 7, as shown in FIG. 10. With such guides, the feet of the operator 8 are necessarily guided to the respective predetermined positions on the support plate 7, and thus, the operator can be prevented from standing face to the display 1. The distances E1 and E2 may be equal or may be different from each other.

Although the present invention has been described with using the preferred embodiment, the present invention is not limited thereto and can be modified within the technical scope defined by the appended claims.

For example, the present invention can be applied to various simulators for simulating any other movements than the snow board movement. The first reactive force applying device 18 and the second reactive force applying device 28 may have other constructions than that used in the embodiment so long as the operation defined by the appended claims is realizable. As to the handrails 11, a single handrail may be provided only between the operator 8 and the display 1 or two handrails may be provided on only the both sides of the support plate 7. Further, the configuration of the handrail 11 is not always a straight rod member and may be a curved rod member.

What is claimed is:

1. A simulator for presenting a simulation movement on presentation means correspondingly to a movement of an operator, comprising:

an arm member being reciprocally turnable about a first axis line;

a support plate for supporting the operator, the support plate being supported by said arm member and tiltable about a second axis line extending in a direction crossing the first axis line;

first reactive force applying means for holding said arm member in a free state in a neutral position with respect to the first axis line and for applying a reactive force to said arm member when said arm member is turned to a direction in which said arm member deviates from the neutral position;

second reactive force applying means for holding said support plate in a free state in a neutral position with respect to the second axis line and for applying a reactive force to said support plate when said support plate is tilted to a direction in which said support plate deviates from the neutral position, the second reactive force applying means being supported by said arm member; and control means for controlling the simulation movement on said presentation means correspondingly to a movement of said support plate about the first and second axis lines.

2. The simulator claimed in claim 1, wherein the second axis line is orthogonal to the first axis line.

3. The simulator claimed in claim 1, wherein at least one of said first and second reactive force applying means comprises:

a core member having a cornered cross section and movable integrally with said support plate;

a casing member having a cornered cross section and surrounding said core member; and an elastic member provided in a space defined between said core member and said casing member.

4. The simulator claimed in claim 1, wherein said presentation means comprises a display for displaying a virtual game space as a video image.

5. The simulator claimed in claim 1, wherein said support plate comprises a single board having a configuration similar to a snow board for sliding on a snow ground and said presentation means displays a scenery of a ski ground as a virtual game space.

6. The simulator claimed in claim 1, wherein said control means comprises:

first rotation angle detection means provided on the first axis line of said support plate for detecting a turning angle of said support plate about the first axis line; and second rotation angle detection means provided on the second axis line of said support plate for detecting a tilting angle of said support plate about the second axis line.

7. The simulator claimed in claim 1, further comprising a handrail member provided in a space surrounding said support plate for supporting the operator.

8. The simulator claimed in claim 7, wherein said handrail member comprises rod members extending between said presentation means and the operator on said support plate with feet of the operator being on a center line of said support plate and perpendicularly to said support plate and extending both sides of and in parallel to said support plate.

9. The simulator claimed in claim 1, wherein protruding guides are provided on said support plate for guiding feet of the operator.

10. The simulator claimed in claim 9, wherein each said protruding guide comprising a plurality of protrusions arranged in parallel to each other and along a center line of said support plate, with a distance corresponding to a length of foot of the operator.

11. The simulator claimed in claim 2, wherein at least one of said first and second reactive force applying means comprises:
   a core member having a cornered cross section and movable integrally with said support plate;
   a casing member having a cornered cross section and surrounding said core member; and
   an elastic member provided in a space defined between said core member and said casing member.

12. The simulator claimed in claim 11, wherein said presentation means comprises a display for displaying a virtual game space as a video image.

13. The simulator claimed in claim 12, wherein said support plate comprises a single board having a configuration similar to a snow board for sliding on a snow ground and said presentation means displays a scenery of a ski ground as a virtual game space.

14. The simulator claimed in claim 13, wherein said control means comprises:
   first rotation angle detection means provided on the first axis line of said support plate for detecting a turning angle of said support plate about the first axis line; and
   second rotation angle detection means provided on the second axis line of said support plate for detecting a tilting angle of said support plate about the second axis line.

15. The simulator claimed in claim 14, further comprising a handrail member provided in a space surrounding said support plate for supporting the operator.

16. The simulator claimed in claim 15, wherein said handrail member comprises rod members extending between said presentation means and the operator on said support plate with feet of the operator being on a center line of said support plate and perpendicularly to said support plate and extending both sides of and in parallel to said support plate.

17. The simulator claimed in claim 16, wherein protruding guides are provided on said support plate for guiding feet of the operator.

18. The simulator claimed in claim 17, wherein each said protruding guide comprising a plurality of protrusions arranged in parallel to each other and along a center line of said support plate, with a distance corresponding to a length of foot of the operator.

19. The simulator claimed in claim 1, wherein a center turning axis of said support plate is defined by the first axis line, the first axis line being spaced from said support plate.

* * * * *